United States Patent
Moriwaki et al.

(10) Patent No.: US 7,112,376 B2
(45) Date of Patent: Sep. 26, 2006

(54) MAGNETIC RECORDING MEDIUM

(75) Inventors: Kenichi Moriwaki, Kanagawa (JP);
Kazuyuki Usuki, Kanagawa (JP);
Masakazu Nishikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 98 days.

(21) Appl. No.: 10/753,366

(22) Filed: Jan. 9, 2004

(65) Prior Publication Data

US 2004/0142210 A1 Jul. 22, 2004

(30) Foreign Application Priority Data

Jan. 10, 2003 (JP) ............ P.2003-004589

(51) Int. Cl.
G11B 5/66 (2006.01)
G11B 5/70 (2006.01)

(52) U.S. Cl. ............ 428/831; 428/667; 428/900

(58) Field of Classification Search .......... 428/694 TS, 428/611, 667, 694 TR, 336, 900, 847, 847.1, 428/847.2, 847.3, 847.4, 847.7, 831
See application file for complete search history.

(56) References Cited

U.S. PATENT DOCUMENTS 6,562,481 B1 * 5/2003 Kaitsu et al. ............ 428/611
6,740,383 B1 * 5/2004 Shinohara et al. ......... 428/65.3
2003/0186085 A1 * 10/2003 Murata et al. ......... 428/694 ST

FOREIGN PATENT DOCUMENTS

| JP | 5-73880 A | 3/1993 |
| JP | 7-254128 A | 10/1995 |
| JP | 7-311929 A | 11/1995 |
| JP | 2001-291230 A | 10/2001 |

* cited by examiner

Primary Examiner—Holly Rickman
(74) Attorney, Agent, or Firm—Sughrue Mion, PLLC

(57) ABSTRACT

A magnetic recording medium comprising; a nonmagnetic support; a first under layer which is constituted by a nonmetal element, per se, a compound consisting of nonmetal elements, or a compound containing titanium and a nonmetal element; a second under layer containing at least one element selected from the group consisting of chromium, titanium, iridium, platinum, palladium, ruthenium, rhodium, rhenium and osmium; and a magnetic layer which contains a ferromagnetic metal alloy containing at least cobalt, platinum and chromium, and a nonmagnetic compound, in this order.

26 Claims, 2 Drawing Sheets

MAGNETIC RECORDING MEDIUM

FIELD OF THE INVENTION

The present invention relates to a magnetic recording medium. More specifically, the present invention relates to a magnetic recording medium capable of high density recording for use for digital data recording which can be reproduced with a high speed magnetoresistance head.

BACKGROUND OF THE INVENTION

With the spread of the Internet in recent years, the use form of the computer has been changed, e.g., to the form of processing a great volume of moving picture data and sound data with a personal computer. Along with these trends, the storage capacity required of the magnetic recording media, such as hard discs, has increased.

In a hard disc apparatus, a magnetic head slightly floats from the surface of a magnetic disc with the rotation of the magnetic disc and magnetic recording is performed by non-contact recording. This mechanism prevents the magnetic disc from breaking by the contact of the magnetic head and the magnetic disc. With the increase of density of magnetic recording, the floating height of a magnetic head is gradually decreased, and now the floating height of from 10 to 20 nm has been realized by the use a magnetic disc comprising a specularly polished hyper-smooth glass substrate having provided thereon a magnetic recording layer (a magnetic layer). In a magnetic recording medium, the layer structure of a CoPtCr series magnetic layer/a Cr under layer is generally used, and the direction of easy magnetization of the CoPtCr series magnetic layer is controlled in the direction of in-plane of the film by the Cr under layer by increasing the temperature in forming the magnetic layer and the under layer as high as 200 to 500° C. Further, the magnetic domain in the magnetic layer is segregated by accelerating the segregation of Cr in the CoPtCr series magnetic layer. Areal recording density and recording capacity of hard disc drive have markedly increased during the past few years by technological innovation, e.g., the floating height reduction of a head, the improvement of the structure of a head, and the improvement of the recording film of a disc.

With the increase of throughput of digital data, there arises a need of moving a high capacity data, such as moving data, by recording on a commutable medium. However, since the substrate of a hard disc is made of a hard material and the distance between a head and a disc is extremely narrow as described above, there is the fear of happening of accident by the collision of a head and a disc and entraining dusts during operation when a hard disc is used as a commutable medium such as a flexible disc and a rewritable optical disc, and so a hard disc cannot be used.

Further, when a high temperature sputtering film-forming method is used in manufacturing a magnetic recording medium, not only productivity is poor but the cost in mass production increases, thus hard discs cannot be manufactured inexpensively.

On the other hand, the substrate of a flexible disc comprises a flexible polymer film and is excellent in commutability, since it is a medium capable of contact recording, and so flexible discs can be manufactured inexpensively. However, commercially available flexible discs of nowadays have such a structure that the recording layer is formed by coating a magnetic powder on a polymer film together with a polymer binder and an abrasive. Therefore, the high density recording characteristics of the magnetic layer of flexible discs are inferior to those of hard discs having a magnetic layer formed by sputtering, and the achieved recording density of flexible discs is only ⅒ or less of that of hard discs.

Accordingly, a ferromagnetic metal thin film type flexible disc having a recording film (a magnetic layer) formed by the sate sputtering method as in hard discs is suggested. However, when the same magnetic layer as that of hard discs is tried to be formed on a polymer film, the polymer film is greatly damaged by heat and it is difficult to put such a flexible disc to practical use. Further, since the contact of a head with a medium is inevitable, a hard protective layer is indispensable. Therefore, it is also suggested to use highly heat resisting polyimide and aromatic polyamide films as polymer films, but these heat resisting films are very expensive and it is also difficult to put them to practical use. When a magnetic layer is tried to be formed with cooling so as not to give thermal damage to the polymer films, the magnetic characteristics of the magnetic layer are insufficient, thus recording density can be hardly improved.

On the other hand, it has come to be known that when a ferromagnetic metal thin film comprising a ferromagnetic metal alloy and a nonmagnetic oxide is used, almost the same magnetic characteristics as those of the CoPtCr series magnetic layer formed under a high temperature condition of from 200 to 500° C. can be obtained even when a recording layer is formed under room temperature. As such a ferromagnetic metal thin film comprising a ferromagnetic metal alloy and a nonmagnetic oxide, ferromagnaticmetal thin films having a so-called granular structure which is proposed in hard discs can be used (refer to, e.g., JP-A-5-73880 and JP-A-7-311929).

However, even when a magnetic layer having such a granular structure is formed at room temperature, since heat by sputtering is applied, the gas contained in the polymer film support is released, so that the crystal growth of the under layer and the magnetic layer extremely lower as shown in FIG. 2. Therefore, the control of crystal orientation is very difficult, so that satisfactory characteristics have not been obtained yet.

On the other hand, in direct read after write and rewritable optical discs represented by DVD-R/RW, the head and the disc are not close to each other as in a magnetic disc, and so they are excellent in commutability and widespread. However, from the thickness of light pickup and economical viewpoints, it is difficult for the optical disc to take such a disc structure that both surfaces can be used as recording surfaces as in a magnetic disc which is advantageous to improve capacity. In addition, the optical discs are low in areal recording density and in data transfer speed as compared with a magnetic disc, so that their performance cannot be said to be sufficient to be used as rewritable type high capacity recording media.

SUMMARY OF THE INVENTION

Accordingly, an object of the present invention is to solve the above problems and provide a rewritable, commutable high capacity magnetic recording medium having sufficient performances and reliability and economically advantageous, which is not accompanied by lowering of crystal orientation and crystal growth of the under layer and the magnetic layer by the influence of the gas released from the polymer film support, and capable of achieving good magnetic characteristics.

As a result of eager investigation, the present inventors have found that the above problems can be solved by adopting the following constitution, thus the present invention has been accomplished.

That is, the present invention is as follows.

(1) A magnetic recording medium comprising a nonmagnetic support having provided on at least one side of the support in the order of a first under layer constituted by a single nonmetal element, a compound consisting of nonmetal elements or a compound comprising titanium and a nonmetal element, a second under layer containing at least one element selected from the group consisting of chromium, titanium, iridium, platinum, palladium, ruthenium, rhodium, rhenium and osmium, and a magnetic layer comprising a ferromagnetic metal alloy containing at least cobalt, platinum and chromium, and a nonmagnetic compound.

The preferred embodiments of the present invention are described below.

(2) A magnetic recording medium comprising a nonmagnetic flexible polymer support having provided on at least one side of the support in the order of a first under layer constituted by a single nonmetal element, a compound consisting of nonmetal elements or a compound comprising titanium and a nonmetal element, a second under layer containing at least one element selected from the group consisting of chromium, titanium, iridium, platinum, palladium, ruthenium, rhodium, rhenium, osmium, cobalt, tungsten, vanadium, iron and molybdenum, and a magnetic layer comprising a ferromagnetic metal alloy containing at least cobalt, platinum and chromium, and a nonmagnetic compound (3) The magnetic recording medium as described in the above item (1) or (2), wherein the nonmetal element contained in the first under layer is selected from C, Si, X, Te, As, Se, I, N and O.

(4) The magnetic recording medium as described in the above item (1), (2) or (3) wherein the crystal growth defective layer of the second under layer at the interface between the first under layer and the second under layer is 5 nm or less.

(5) The magnetic recording medium as described in any of the above item (1) to (4), wherein the surface roughness (SRa) at the surface of the magnetic recording medium after film formation is 3 nm or less.

Since the magnetic recording medium according to the present invention has a magnetic layer of a ferromagnetic metal thin film comprising a ferromagnetic metal alloy containing at least cobalt (Co), platinum (Pt) and chromium (Cr), and a nonmagnetic oxide, high density recording as in a hard disc becomes possible, so that the capacity of the medium can be increased.

Ferromagnetic metal thin films comprising a ferromagnetic metal alloy containing Co, Pt and Cr, and a nonmagnetic oxide have a so-called granular structure which is proposed in hard discs, and those disclosed in JP-A-5-73880 and JP-A-7-311929 can be used.

Further, since the first under layer of the magnetic recording medium of the intention has an effect of shielding the gas released from the support and an effect of heightening the crystal orientation of the second under layer, the problem of released gas which has been a problem waiting solution in a medium using a film support can be solved.

By using these first under layer, second under layer and magnetic layer, the need for heating the substrate can be obviated and good magnetic characteristics can be achieved even the temperature of the substrate is room temperature, so that a magnetic recording medium free of the problem of released gas from the support can be obtained. Accordingly, it is possible to provide a flat magnetic tape and a flexible disc resistive to contact recording without bringing about heat damage with not only a glass substrate and an Al substrate but even with a polymer film support.

DESCRIPTION OF REFERENCE NUMERALS AND SIGNS

Figure 1:
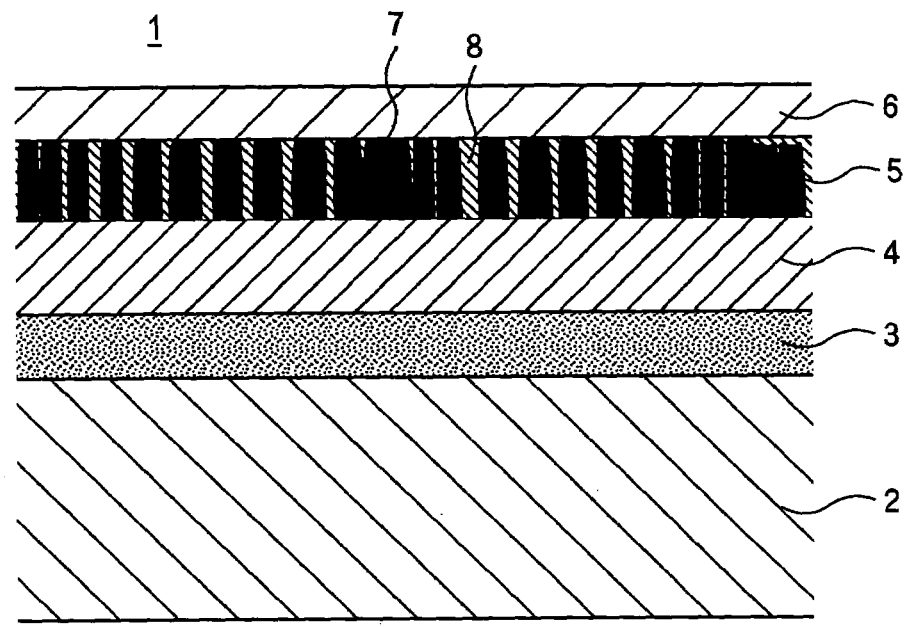
FIG. 1 is a typical drawing showing the layer structure of the magnetic recording medium according to the present invention.
Figure 2:
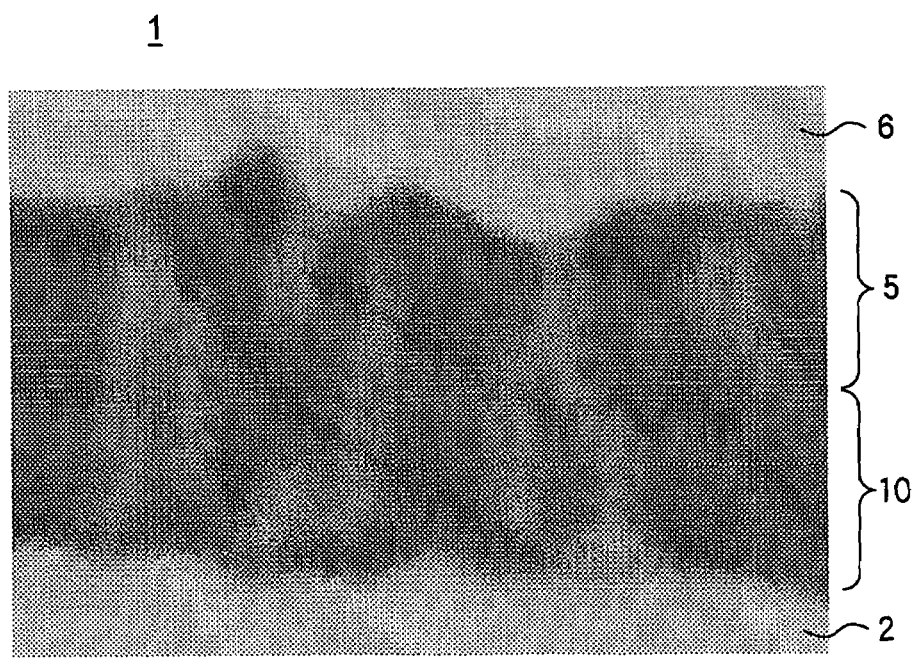
FIG. 2 is a typical drawing showing the layer structure of a conventional magnetic recording medium.

1: Magnetic recording medium
2: Nonmagnetic polymer support
3: First under layer
4: Second under layer
5: Magnetic layer
6: Protective layer
7: Ferromagnetic metal alloy
8: Nonmagnetic compound
10: Monolayer under layer
11: Film-forming apparatus
12: Vacuum chamber
13: Unwinding roller
14: Flexible polymer support
15A, 15B: Tension-adjusting rollers
16: Film-forming chamber
17A, 17B, 17C, 17D: Gas-feeding pipes for sputtering
18A, 18B: Film-forming rollers
19A, 19B, 19C, 19D: Sputtering apparatus of under layer
TA, TB, TC, TD: Targets
31: Magnetic layer
32: Flexible polymer support
33: Roller
34: Bias roller
35: Bias supply
36: Film-forming roller
37: Feedstock gas
38: High frequency power supply
39: Carbon-protecting film
40: Winding roller

DETAILED DESCRIPTION OF THE INVENTION

The magnetic recording medium in the invention comprises a nonmagnetic support having provided on at least one side of the support a first under layer constituted by a single nonmetal element, a compound consisting of nonmetal elements or a compound selected from the compounds comprising titanium and a nonmetal element, a second under layer containing at least one element selected from the group consisting of chromium, titanium, iridium, platinum, palladium, ruthenium, rhodium, rhenium, osmium, cobalt, tungsten, vanadium, iron and molybdenum, and a magnetic layer comprising a ferromagnetic metal alloy containing at least cobalt, platinum and chromium, and a nonmagnetic compound. Accordingly, when a polymer film is used as the support, crystal orientation growth of the second under layer and the magnetic layer does not lower by the gas released from the polymer film in forming the second under layer and the magnetic layer by sputtering, and so excellent characteristics can be achieved.

The magnetic recording medium in the present invention is described with reference to the accompanying drawings.

FIG. 1 is a typical drawing showing the layer structure of the magnetic recording medium in an example according to the present invention.

Magnetic recording medium 1 of the present invention comprises nonmagnetic support 2 having provided thereon first under layer 3, second under layer 4 and magnetic layer 5 in this order, and if necessary, protective layer 6 may be provided on magnetic layer 5.

Magnetic Layer:

The magnetic layer which constitutes the magnetic recording medium of the invention is a magnetic layer comprising ferromagnetic thin film comprising a ferromagnetic metal alloy containing at least cobalt, platinum and chromium, and a nonmagnetic compound.

Since the magnetic recording medium of the invention is provided with the magnetic layer, high density recording as in a hard disc becomes possible, so that the capacity increase of a removable type magnetic recording medium becomes possible. The magnetic layer of ferromagnetic thin film comprising a ferromagnetic metal alloy containing cobalt and a nonmagnetic metal oxide can be manufactured by the same methods as the methods which are proposed in hard discs and disclosed in JP-A-5-73880 and JP-A-7-311929.

Magnetic layer 5 comprises ferromagnetic metal alloy 7 containing at least cobalt, platinum and chromium and nonmagnetic compound 8. Ferromagnetic metal alloy 7 and nonmagnetic compound 8 are present as a mixture in appearance, but ferromagnetic metal alloy 7 shown in FIG. 1 is a part where the existing amount of the ferromagnetic metal alloy is predominant as compared with the entire composition, and nonmagnetic compound 8 is a part where the existing amount of the nonmagnetic compound is predominant as compared with the entire composition. The parts where the existing amount of the ferromagnetic metal alloy is predominant are formed mutually with a distance of from 0.01 to 10 nm.

Magnetic layer 5 in the magnetic recording medium of the invention may be a so-called vertical magnetic recording layer having an axis of easy magnetization in the vertical direction to magnetic layer 5, or may be an in-plane magnetic recording layer having an axis of easy magnetization in the horizontal direction. The direction of an axis of easy magnetization can be controlled by the materials, the film-forming conditions or the crystal structures of second under layer 4 described later, and the compositions and the film-forming conditions of the magnetic film.

It is preferred that the crystal growth of magnetic layer 5 of the invention be induced by reflecting the crystal orientation of second under layer 4 and the prismatic structure as shown in FIG. 1 be formed. By taking such a structure, the separated structure of the domain where the ferromagnetic metal alloy predominates by the domain where the nonmagnetic compound predominates becomes stable, and a high coercive force can be maintained and, at the same time, high output is possible, since the amount of magnetization increases in the domain where the ferromagnetic metal alloy predominates, and further the noise can be reduced, since the dispersibility of the domain where the ferromagnetic metal alloy predominates becomes homogeneous.

As the ferromagnetic metal alloys containing cobalt, platinum and chromium, alloys comprising Co, Cr, Pt with elements, e.g., Ni, Fe, B, Si, Ta, Nb and the like can be used, but Co—Pt—Cr, Co—Pt—Cr—Ta, Co—Pt—Cr—B are particularly preferred considering recording characteristics.

As the nonmagnetic compounds, oxides, carbides and nitrides of Si, Zr, Ta, B, Ti, Al, Cr, Ba, Zn, Na, La, In, Pb and the like can be used, but $SiO_x$ is most preferred taking recording characteristics into consideration.

The mixing ratio of the ferromagnetic metal alloy containing cobalt, platinum and chromium and the nonmagnetic compound is preferably ferromagnetic metal alloy/nonmagnetic compound of from 95/5 to 80/20 (atomic ratio), and particularly preferably from 90/10 to 85/15. When the proportion of the ferromagnetic metal alloy is more than this range, the separation of magnetic particles is insufficient, as a result the coercive force lowers in some cases. While when the proportion of the ferromagnetic metal alloy is less than this range, the amount of magnetization decreases, and so signal output sometimes conspicuously 1 wers.

The layer thickness of the magnetic layer comprising the mixture of the ferromagnetic metal alloy containing cobalt, platinum and chromium and the nonmagnetic compound is preferably from 10 to 60 nm, and more preferably from 10 to 40 nm. When the layer thickness of the magnetic layer is more than this range, the noise sometimes conspicuously increases, while when the thickness is less than that, the output sometimes markedly decreases.

The magnetic layer comprising the ferromagnetic metal alloy containing cobalt, platinum and chromium and a nonmagnetic substance can be formed by vacuum film-forming methods, e.g., vacuum deposition and sputtering of these methods, a sputtering method is preferably used in the present invention for capable of forming a thin film of high quality with ease. Any of a DC sputtering method and an RF sputtering method can be used as the sputtering method. A web sputtering system of continuously forming a layer on a continuous film and a batch sputtering system can be used in sputtering, but it is preferred to use a web sputtering system in the present invention.

Argon can be used as the gas in a sputtering atmosphere but other rare gases can also be used. A trace amount of oxygen may be introduced for adjusting the oxygen content of the nonmagnetic compound and the surface roughness.

In particular, for forming the magnetic layer comprising the ferromagnetic metal alloy containing cobalt, platinum and chromium and a nonmagnetic compound by a sputtering system as in the present invention, it is also possible to use two kinds of a ferromagnetic metal alloy target and a nonmagnetic compound target, and to use a co-sputtering system of these two targets. However, when a mixture target obtained by homogeneously mixing a ferromagnetic metal alloy and a nonmagnetic compound concurring with the composition ratio of the ferromagnetic metal alloy and the nonmagnetic compound to be formed is used, a magnetic layer in which the ferromagnetic metal alloy is homogeneously dispersed can be formed. The mixture target can be manufactured by a hot press method.

First Under Layer:

First under layer 3 in the magnetic recording medium of the invention is constituted by a single nonmetal element, a compound consisting nonmetal elements or a compound selected from the compounds comprising titanium and a nonmetal element.

As the single nonmetal element contained in the first under layer, C, Si and B are preferred. As the mixture of nonmetal elements, the compounds comprising the elements selected from C, N, O, Si, B, Te, As, Se and I are preferred. Of these nonmetal elements, the compounds comprising the elements selected from C, N, O, Si and B are more preferred. Specifically, the compounds comprising Si and C, Si and O, Si and N, B and C, B and N, and B and O are exemplified. As the compound comprising titanium and a nonmetal element, the compounds comprising Ti and C, Ti and N, Ti and O, and Ti and B are preferred.

Since the gas released from the nonmagnetic support is shielded by forming the first under layer, the crystal growth of the second under layer and the magnetic layer provided thereon is improved.

The first under layer preferably has a layer thickness of from 1 to 50 nm, and particularly preferably from 1 to 30 nm. When the thickness of the first under layer is greater than 50 nm, the support is liable to be deformed due to film stress and a crack occurs with ease and, at the same time, the productivity is deteriorated, contrary to this, when the thickness is smaller than 1 nm, the effect of shielding the gas released from the support lowers and does not contribute to improve the crystal growth of the second under layer and the magnetic layer.

Second Under Layer:

the second under layer in the magnetic recording medium of the invention comprises an alloy containing at least one element selected from the group consisting of chromium (Cr), titanium (Ti), iridium (Ir), platinum (Pt), palladium (Pd), ruthenium (Ru), rhodium (Rh), rhenium (Re), osmium (Os), cobalt (Co), tungsten (W), vanadium (V), iron (Fe) and molybdenum (MO)

It is preferred to use alloys containing at least one element selected from the group consisting of chromium (Cr), titanium (Ti), iridium (Ir), platinum (Pt), palladium (Pd), ruthenium (Ru), rhodium (Rh), rhenium (Re) and osmium (Os) in proportion of 50 atomic % or more.

By using the second under layer, the orientation of the magnetic layer can be improved, so that the recording characteristics can be elevated.

The thickness of the second under layer comprising the above alloy is preferably from 1 to 50 nm, and particularly preferably from 1 to 35 nm. When the thickness is more than this range, the productivity lowers and, at the same time, noise is liable to increase in reading recorded data due to the thickening of the crystal grains. When the thickness is less than this range, the improvement of the magnetic layer by the effect of the under layers cannot be obtained in some cases.

The first and second under layers can be formed by vacuum film-forming methods, e.g., vacuum deposition and sputtering. Of these methods, a sputtering method is preferably used in the present invention for capable of forming a hyper-thin film having a good quality with ease. Any of a DC sputtering method and an RF sputtering method can be used as the sputtering method. A web sputtering system of continuously forming a layer on a continuous film is preferably used in the case of a flexible disc using a flexible polymer support. When an aluminum support or a glass support is used, a batch sputtering system and an in-line sputtering system can also be used.

When the first and second under layers are formed by sputtering, argon can be used as the sputtering gas but other rare gases can also be used. A trace amount of oxygen gas may be introduced for controlling the lattice constant of the under layers.

For forming the under layers containing a plurality of elements by a sputtering system, it is also possible to use a plurality of targets comprising each element target and to use a co-sputtering system of these targets. However, it is preferred to use a complex target by all the elements to be used for precisely controlling the lattice constant and manufacturing a homogeneous film. The complex target can be manufactured by a hot press method.

A nonmagnetic support used in the magnetic recording medium of the invention is not particularly limited, but a flexible polymer support comprising a synthetic resin film capable of avoiding the impact at the time when a magnetic head and a magnetic disc are brought into contact is preferably used. As such synthetic resin films, synthetic resin films comprising aromatic polyimide, aromatic polyamide, aromatic polyamideimide, polyether ketone, polyether sulfone, polyether imide, polysulfone, polyphenylene sulfide, polyethylene naphthalate, polyethylene trephthalate, polycarbonate, triacetate cellulose, and a fluorine resin are exemplified. Polyethylene terephthalate and polyethylene naphthalate having good surface property and easily available are particularly preferably used in the present invention, since good recording characteristics can be obtained without heating a substrate.

Further, a laminated film comprising a plurality of synthetic resin films may be used as a flexible polymer support. By using a laminated film comprising a plurality of films, warpage and undulation attributable to a support itself can be reduced, as a result, the scratch resistance of a magnetic recording medium by the collision of the surface of a magnetic recording medium and a magnetic head can be markedly improved.

As methods of laminating flexible films, roll lamination by a heated roller, flat sheet lamination by flat sheet hot press, dry lamination by coating an adhesive on the surface to be adhered and then performing lamination, and lamination using an adhesive sheet previously formed in the form of sheet are exemplified. When adhesives are used in lamination, a hot melt adhesive, a thermosetting adhesive, an UV-curable adhesive, an EB-curable adhesive, an adhesive sheet and an anaerobic adhesive can be used.

A flexible polymer support has a thickness of from 10 to 200 μm, preferably from 20 to 150 μm, and more preferably from 30 to 100 μm. When the thickness of a flexible polymer support is less than 10 μm, the stability at high speed rotation lowers and sometimes run out increases. On the other hand, when the thickness of a flexible polymer support is more than 200 μm, the stiffness at rotation increases and it becomes difficult to avoid the impact by collision, which causes jumping of a magnetic head in some cases.

The nerve of a flexible polymer support is represented by the following equation, and the value of the nerve is preferably from 4.9 to 19.6 MPa (from 0.5 to 2.0 kgf/mm$^2$) when b=10 mm, and more preferably from 6.9 to 14.7 MPa (from 0.7 to 1.5 kgf/mm$^2$):

Nerve of flexible polymer support=$Edb^3/12$ wherein E represents Young's modulus, b represents a film breadth, and d represents a film thickness.

The surface of a flexible polymer support is preferably as smooth as possible for performing recording by a magnetic head. The unevenness of the surface of a support markedly degrades the recording and reproducing characteristics of signals. Specifically, when a subbing layer described later is used, the central plane average surface roughness (SRa) measured by a light interference type surface roughness meter is 5 nm or less, and preferably 2 nm or less, and the height of protrusion measured by a feeler type surface roughness meter is 1 μm or less, and preferably 0.1 μm or less. When a subbing layer is not used, the central plane average surface roughness (SRa) measured by a light interference type surface roughness meter is 3 nm or less, and preferably 1 nm or less, and the protrusion height measured by a feeler type surface roughness meter is 0.1 μm or less, and preferably 0.06 μm or less.

It is preferred to form a subbing layer on the surface of a flexible polymer support for the purpose of improving a surface property and a gas-shielding property. For forming a magnetic layer and under layers by sputtering, it is preferred that a subbing layer be excellent in heat resistance, and as the materials of a subbing layer, e.g., polyamide resins, polyamideimide resins, silicone resins and fluorine resins can be used. Thermosetting polyimide resins and thermosetting silicone resins have a high smoothing effect and particularly preferred. A subbing layer has a thickness of preferably from 0.1 to 3.0 μm. When other resin films are laminated on a support, a subbing layer may be formed before lamination processing, or a subbing layer may be formed after lamination processing.

As the thermosetting polyimide resins, polyimide resins which are obtained by thermally polymerizing an imide monomer having two or more terminal unsaturated groups in the molecule, e.g., bisallylnadiimide (BANI, manufactured by Maruzen Petrochemical Co., Ltd.), are preferably used, This imide monomer can be thermally polymerized at a relatively low temperature after being coated in the state of monomer on the surface of a support, and so the material monomer can be directly coated on a support and hardened. The imide monomer can be used by being dissolved in ordinary organic solvents, is excellent in productivity and working efficiency, has a small molecular weight, and the solution of the imide monomer is low in viscosity, so that it gets into the unevenness well in coating and is excellent in smoothing effect.

As the thermosetting silicone resins, silicone resins obtained by polymerization by a sol-gel method with silicon compounds having introduced an organic group as the starting material are preferably used. The silicone resins have a structure in which a part of the silicon dioxide bonding is substituted with an organic group, and the resins are greatly excellent in heat resistance as compared with silicone rubbers andmore flexible than silicon dioxide films, therefore, cracking and peeling are hardly generated when a resin film is formed on a support comprising a flexible film. In addition, since the starting material monomers can be directly coated on a flexible polymer support and hardened, a general purpose solvent can be used, the resins get into the unevenness well, and smoothing effect is high. Since condensation polymerization reaction advances from comparatively low temperature by the addition of a catalyst such as an acid and a chelating agent, hardening can be expedited, and a resin film can be formed with a general purpose coating apparatus Further, thermosetting silicone resins are excellent in a gas-shielding property of shielding gases which are generated from a flexible polymer support when a magnetic layer is formed and hinder the crystallizability and orientation of the magnetic layer and the under layers, so that they can be particularly preferably used.

It is preferred to provide minute protrusions (texture) on the surface of a subbing layer for the purpose of reducing the true contact area of a magnetic head and a flexible disc and improving the sliding property. Further, the handling property of a flexible polymer support can be improved by providing minute protrusions. As methods of forming minute protrusions, a method of coating spherical silica particles and a method of coating an emulsion to thereby form the protrusions of an organic substance can be used, and a method of coating spherical silica particles is preferred for ensuring the heat resistance of a subbing layer.

The height of minute protrusions is preferably from 5 to 60 nm, and more preferably from 10 to 30 nm. When the height of minute protrusions is too high, the recording and reproducing characteristics of signals are deteriorated due to the spacing loss between recording/reproducing heads and the medium, and when the height of minute protrusions is too low, the improving effect of a sliding property decreases. The density of minute protrusions is preferably from 0.1 to $100/\mu m^2$, and more preferably from 1 to $10/\mu m^2$. When the density of minute protrusions is too low, the improving effect of a sliding property sometimes decreases, while when it is too great, high protrusions increase by the increase of agglomerated particles, and recording and reproducing characteristics are degraded in some cases.

Further, minute protrusions can also be fixed on the surface of a support by a binder. It is preferred to use resins having sufficient heat resistance as the binder. As the resins having heat resistance, solvent-soluble polyimide resins, thermosetting polyimide resins and thermosetting silicone resins are particularly preferably used.

It is preferred to provide protective layer 7 on the surface of magnetic layer 5. Protective layer 7 is provided for the purpose of preventing the corrosion of the metallic materials contained in magnetic layer 5, and preventing the abrasion of magnetic layer 5 by the pseudo contact of a magnetic head and the magnetic disc or by contact sliding, to thereby improve running durability and corrosion resistance. Oxides, e g., silica, alumina, titania, zirconia, cobalt oxide and nickel oxide, nitrides, e.g., titanium nitride, silicon nitride and boron nitride, carbides, e.g., silicon carbide, chromium carbide and boron carbide, and carbons, e.g., graphite and amorphous carbon can be used in a protective layer.

A protective layer is a hard film having a hardness equal to or higher than that of the material of a magnetic head, and those which hardly cause burning during sliding and stably maintain the effect are preferred, since such hard films are excellent in sliding durability. At the same time, those which have less pinholes are excellent in corrosion resistance and preferred. As such a protective layer, a hard carbon film called diamond-like carbon (DLC) manufactured by a CVD method is exemplified.

A protective layer can be formed by laminating two or more thin films each having different property. For example, it becomes possible to reconcile corrosion resistance and durability on a high level by providing a hard carbon protective layer on the surface side for improving sliding characteristics and a nitride protective layer, e.g., silicon nitride, on the magnetic recording layer side for improving corrosion resistance.

A lubricating layer is provided on a protective layer for improving running durability and corrosion resistance, if necessary. Lubricants, e.g., a hydrocarbon lubricant, a fluorine lubricant and an extreme pressure additive are used in a lubricating layer.

As the hydrocarbon lubricants, carboxylic acids, e.g., stearic acid and oleic acid, esters, e.g., butyl stearate, sulfonic acids, e.g., octadecylsulfonic acid, phosphoric esters, e.g., monooctadecyl phosphate, alcohols, e.g., stearyl alcohol and oleyl alcohol, carboxylic acid amides, e.g., stearic acid amide, and amines, e.g., stearylamine are exemplified.

The examples of the fluorine lubricants include lubricants obtained by substituting a part or all of the alkyl groups of the above hydrocarbon lubricants with a fluoroalkyl group or a perfluoro polyether group. The examples of the perfluoro polyether groups include a perfluoromethylene oxide polymer, a perfluoroethylene oxide polymer, a perfluoro-n-propylene oxide polymer, $(CF_2CF_2CF_2O)_n$, a perfluoroisopropylene oxide polymer, $[CF(CF_3)CF_2O]_n$, and copolymers of these polymers. As the specific example, a perfluoromethylene-perfluoroethylene copolymer having hydroxyl groups at molecular chain terminals (FOMBLIN Z-DOL, trade name, manufactured by Ausimont K.K.) is exemplified.

As the extreme-pressure additives, phosphoric esters, e.g., trilauryl phosphate, phosphorous esters, e.g., trilauryl phosphite, thiophosphorous esters, e.g., trilauryl trithiophosphite, thiophosphoric esters, and sulfur series extreme-pressure additives, e.g., dibenzyl disulfide, are exemplified.

These lubricants can be used alone or a plurality of lubricants can be used in combination. A lubricating layer can be formed by coating a solution obtained by dissolving a lubricant in an organic solvent on the surface of a protective layer by spin coating, wire bar coating, gravure coating, or dip coating, alternatively depositing the coating solution on the surface of a protective layer by vacuum d position. The coating amount of lubricants i preferably from 1 to 30 mg/m$^2$, and particularly preferably from 2 to 20 mg/m$^2$.

It is also preferred to use a rust preventive in combination for bettering corrosion resistance. The examples of the rust preventives include nitrogen-containing heterocyclic rings, e.g., benzotriazole, benzimidazole, purine, and pyrimidine, derivatives obtained by introducing alkyl side chains to the mother nuclei of the above nitrogen-containing heterocyclic rings, nitrogens- and sulfur-containing heterocyclic rings, e.g., benzothiazole, 2-mercaptobenzothiazole, tetraazaindene ring compounds, and thiouracyl compounds, and derivatives of these nitrogen- and sulfur-containing heterocyclic rings. These rust preventives may be mixed with lubricants and then coated on a protective layer, alternatively they may be coated on a protective layer before coating lubricants, and then lubricants may be coated thereon. The coating amount of rust preventives is preferably from 0.1 to 10 mg/m$^2$, and particularly preferably from 0.5 to 5 mg/m$^2$.

An example of manufacturing method of a magnetic recording medium using a flexible polymer support is described below.

Figure 3:
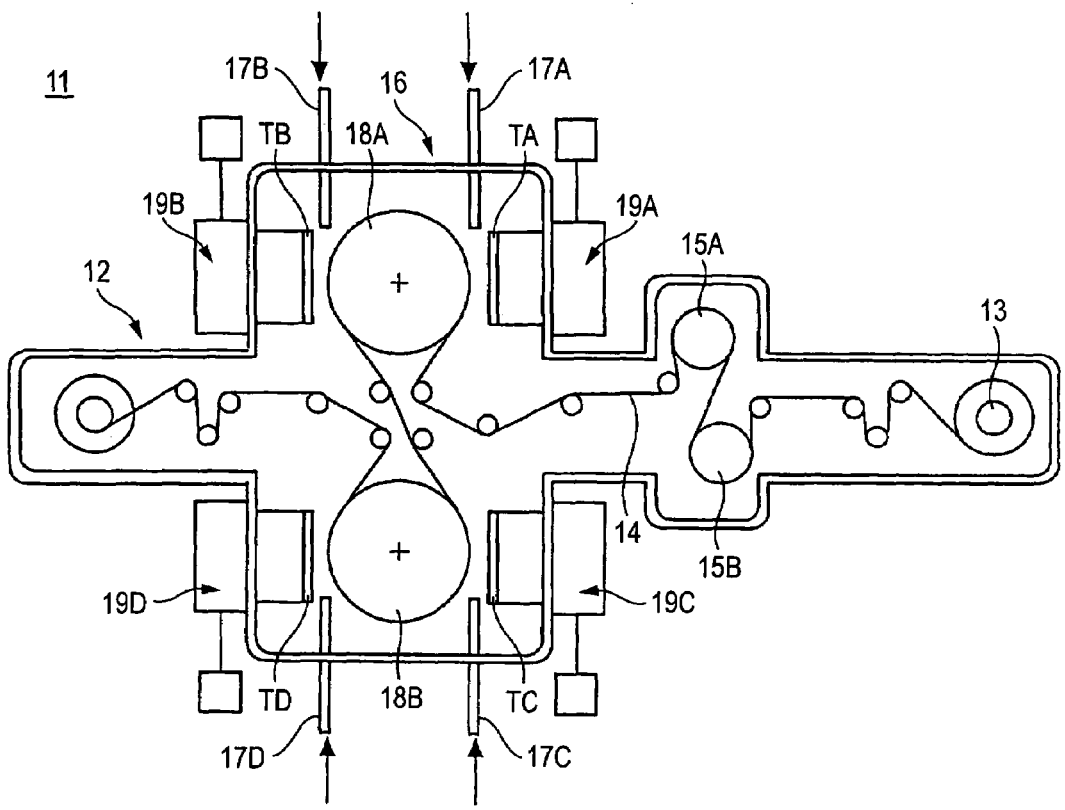
FIG. 3 is a drawing showing the manufacturing method of the magnetic recording medium of the invention and the outline of the manufacturing apparatus.

FIG. 3 is a drawing showing a method of forming a magnetic layer on a flexible polymer support.

Film-forming apparatus 11 is provided with vacuum chamber 12. Flexible polymer support 14 unwound from unwinding roller 13 is delivered to film-forming chamber 16 after the tension is adjusted by tension-adjusting rollers 15A and 15B.

Film-forming chamber 16 is fed with argon gas under a prescribed reduced pressure by a vacuum pump at a prescribed flow rate through sputtering gas-feeding pipes 17A, 17B, 17C and 17D. While transferring flexible polymer support 14 with winding around film-forming roller 18A provided in film-forming chamber 16, the atoms for forming un under layer spring out from target TA of under layer-sputtering apparatus 19A, and an under layer is formed on the flexible polymer support.

In the next place, on the above-formed under layer at film-forming roller 18A, the atoms for forming a magnetic layer are released from target TB of homogeneous dispersion of a ferromagnetic metal alloy and a nonmagnetic compound installed on magnetic layer-sputtering apparatus 19B, and a magnetic layer is formed on the under layer.

Subsequently, while transferring flexible polymer support 14 with winding the side having provided the magnetic layer around film-forming roller 18B, the atoms for forming un under layer spring out from target TC of under layer-sputtering apparatus 19C, and an under layer is formed on the side opposite to the side on which the magnetic layer is provided of the flexible polymer support. Further, at film-forming roller 18B, the atoms for forming a magnetic layer are released from target TD of homogeneous dispersion of a ferromagnetic metal alloy and a nonmagnetic compound installed on magnetic layer-sputtering apparatus 19D, and a magnetic layer is formed on the under layer.

Magnetic layers are provided on both sides of the flexible polymer support by the above process, and the support is wound-up by a wind-up roll.

A method of forming magnetic layers on both sides of the flexible polymer support was described above, but a magnetic layer may be provided on only one side by the same process.

After magnetic layers are formed, a protective layer including diamond-like carbon is formed on the magnetic layers by a CVD method.

Figure 4:
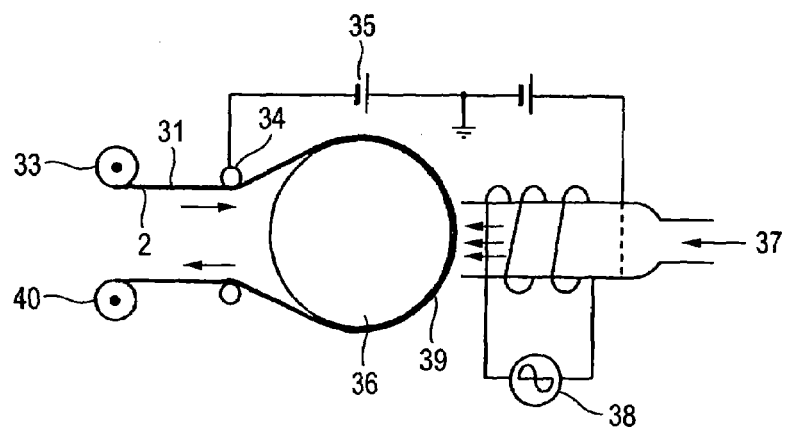
FIG. 4 is a drawing showing an example of CVD apparatus using high frequency plasma applicable to the present invention for forming a protective layer.

FIG. 4 is a drawing showing an example of CVD apparatus using high frequency plasma applicable to the present invention.

Flexible polymer support 32 provided with magnetic layer 31 is unrolled from roll 33, bias voltage is fed to magnetic layer 31 from a bias supply 35 by pass roller 34, and flexible polymer support 32 travels in the state of being wound around film-forming roll 36.

On the other hand, material gas 37 containing hydrocarbon, nitrogen and rare gas forms carbon protective layer 39 containing nitrogen and rare gas on a metal thin film on film-forming roll 36 by the plasma generated by the voltage applied from high frequency power supply 38, and the support is wound-up by wind-up roll 40. Further, adhesion is markedly improved by subjecting the magnetic layer surface to cleaning by glow discharge treatment with rare gas and hydrogen gas before forming a carbon protective layer. Adhesion is further increased by providing a silicon intermediate layer on the surface of the magnetic layer.

EXAMPLES

The present invention is described in further detail below with reference to specific examples, but the present invention should not be construed as being limited thereto.

Example 1

A subbing layer coating solution comprising 3-glycidoxypropyltrimethoxysilane, phenyltriethoxysilane, hydrochloric acid, aluminum acetylacetonate and ethanol was coated on a polyethylene naphthalate (PEN) film having a thickness of 63 μm and a surface roughness (Ra) of 1.4 nm by gravure coating, and the coated layer was dried and hardened at 100° C., thereby a subbing layer having a thickness of 1.0 μm comprising a silicone resin was formed.

A coating solution obtained by mixing silica sol having a particle size of 25 nm and the above subbing layer coating solution was coated on the subbing layer by gravure coating, thereby protrusions having a height of 15 nm were formed on the subbing layer in the density of 10/μm$^2$. The subbing layer was formed on both sides of the PEN film. The PEN film having subbing layers as raw web was mounted on a sputtering apparatus, and the following layers were coated on the subbing layer by a DC magnetron sputtering method while moving the web with keeping in contact with a can (a film-forming roller) cooled with water; a first under layer comprising C in a thickness of 30 nm, a second under layer comprising Ru in a thickness of 25 nm, and a magnetic layer having the composition comprising CoPtCr alloy (Co/Pt/Cr=70/20/10 in atomic ratio)/$SiO_2$=88/12 (atomic ratio) in a thickness of 20 nm.

These first under layer, second under layer and magnetic layer were formed on both sides of the film. Subsequently, the web was mounted on a web type CVD apparatus, and a nitrogen-added DLC protective layer comprising C/H/N of 62/29/7 in molar ratio was formed in a thickness of 10 nm by an RF plasma CVD method using ethylene gas, nitrogen gas and argon gas as reaction gases. At this time, bias voltage of −500 V was applied to the magnetic layer. The protective layer was also provided on both sides of the film.

A lubricating layer having a thickness of 1 nm was formed on the protective layer surface by coating a solution obtained by dissolving a perfluoro polyether lubricant having hydroxyl groups at molecular terminals (FOMBLIN Z-DOL, manufactured by Ausimont K.K.) in a fluorine lubricant (HFE-7200, manufactured by Sumitomo 3M Limited) by gravure coating. The lubricating layer was also formed on both sides of the film.

A 3.7 inch size disc was punched out of the raw web, subjected to tape burnishing treatment, and built into a resin cartridge (for Zip100, manufactured by Fuji Photo Film Co., Ltd.), thereby a flexible disc was obtained.

The characteristics of the obtained flexible disc were evaluated according to the following methods of evaluation. The results obtained are shown in Table 2 below.

Examples 2 to 16 and Comparative Examples 1 to 4

Each flexible disc was manufactured in the same manner as in Example 1 except that the compositions of the first under layer and the second under layer were modified as shown in Table 1 below.

The characteristics of the obtained flexible discs were evaluated according to the following methods of evaluation. The results obtained are shown in Table 2 below.

TABLE 1

| Example No. | First Under Layer | Second Under Layer |
|---|---|---|
| Example 2 | TiN | Ru |
| Example 3 | $TiO_2$ | Ru |
| Example 4 | BN | Ru |
| Example 5 | $B_2O_3$ | Ru |
| Example 6 | SiN | Ru |
| Example 7 | $SiO_2$ | Ru |
| Example 8 | $TeO_2$ | Ru |
| Example 9 | C | Cr |
| Example 10 | TiN | Cr |
| Example 11 | $TiO_2$ | Cr |
| Example 12 | BN | Cr |
| Example 13 | $B_2O_3$ | Cr |
| Example 14 | SiN | Cr |
| Example 15 | $SiO_2$ | Cr |
| Example 16 | $TeO_2$ | Cr |
| Comparative Example 1 | Ti | Ru |
| Comparative Example 2 | — | Ru |
| Comparative Example 3 | Ti | Cr |
| Comparative Example 4 | — | Cr |

Method of Evaluation:
1. Magnetic Characteristics

Coercive force (Hc) was measured with a sample vibration type magnetometer and this was taken as magnetic characteristics.

2. Layer Thickness of Crystal Growth Defective Layer of Second Under Layer by Cross-sectional TEM Photographs In cross-sectional TEM photograph, the layer from the interface between the second under layer and the lower of the second under layer to the place where the prismatic structure was observed in the second under layer was regarded as the crystal growth defective layer, and the layer thickness was evaluated.

3. Surface Roughness (SRa)

Surface roughness (SRa) was obtained from the area of about 500 nm square with AFM contact mode by using SPA-500 (manufactured by Seiko Instruments Inc.) by applying inclination compensation.

TABLE 2

| Example No. | Hc (kA/m) | Crystal Growth Defective Layer (nm) | SRa (nm) |
|---|---|---|---|
| Example 1 | 270 | 2 | 0.9 |
| Example 2 | 265 | 2 | 0.8 |
| Example 3 | 265 | 3 | 0.8 |
| Example 4 | 280 | 5 | 1.1 |
| Example 5 | 275 | 4 | 0.9 |
| Example 6 | 270 | 3 | 0.75 |
| Example 7 | 240 | 2 | 0.75 |
| Example 8 | 260 | 2 | 0.8 |
| Example 9 | 200 | 4 | 0.9 |
| Example 10 | 190 | 3 | 0.8 |
| Example 11 | 190 | 3 | 0.9 |
| Example 12 | 205 | 3 | 1.3 |
| Example 13 | 200 | 3 | 1.0 |
| Example 14 | 200 | 2 | 0.8 |
| Example 15 | 180 | 1 | 0.8 |
| Example 16 | 183 | 2 | 0.8 |
| Comparative Example 1 | 240 | 12 | 2.1 |
| Comparative Example 2 | 220 | 9 | 2.0 |
| Comparative Example 3 | 160 | 15 | 1.8 |
| Comparative Example 4 | 150 | 12 | 1.6 |

As can be understood from the results shown in Table 2, the flexible discs in Examples, the magnetic recording media of the present invention, are excellent in magnetic characteristics, the thickness of the crystal growth defective layer of the second under layer is 5 nm or less, and the surface roughness is satisfactory. On the other hand, the flexible discs in Comparative Examples, in which the first under layer is not used or Ti is used as the first under layer, are unsatisfactory in either one of the thickness of the crystal growth defective layer of the second under layer or the surface roughness.

The magnetic recording medium according to the present invention comprises a nonmagnetic support having thereon in the order of a first under layer, a second under layer, and a magnetic layer comprising a ferromagnetic metal alloy containing cobalt, platinum and chromium and a nonmagnetic compound. By adopting this constitution, the magnetic recording medium according to the present invention has the effect of shielding the gas released from the support and increasing the crystal orientation of the magnetic layer, capable of forming a magnetic layer having excellent magnetic characteristics on a flexible polymer support, thereby high density recording can be realized.

This application is based on Japanese Patent application JP 2003-4589, filed Jan. 10, 2003, the entire content of which is hereby incorporated by reference, the same as if set forth at length.

What is claimed is:

1. A magnetic recording medium comprising:
   a nonmagnetic polymer support having a thickness of from 10 to 200 µm, said polymer support being a resin film containing at least one of aromatic polyimide, aromatic polyamide, aromatic polyamideimide, polyether ketone, polyether sulfone, polyether imide, polysulfone, polyphenylene sulfide, polyethylene naphthalate, polyethylene terephthalate, polycarbonate, triacetate cellulose, and a fluorine resin;
   a subbing layer which contains at least one of a polyimide resin, a polyamideimide resin, a silicone resin and a fluorine resin and has, at its surface, protrusions having a height of from 5 to 60 nm;
   a first under layer which is constituted by a nonmetal element, per se, a compound consisting of nonmetal elements, or a compound containing titanium and a nonmetal element;
   a second under layer containing at least one element selected from the group consisting of chromium, titanium, iridium, platinum, palladium, ruthenium, rhodium, rhenium, osmium, cobalt, tungsten, vanadium, iron and molybdenum; and
   a magnetic layer which contains a ferromagnetic metal alloy containing at least cobalt, platinum and chromium, and a nonmagnetic compound,
   in this order.

2. The magnetic recording medium as claimed in claim 1, wherein the nonmagnetic flexible polymer support has a thickness of from 10 to 100 µm.

3. The magnetic recording medium as claimed in claim 1, wherein the subbing layer has, at its surface, protrusions having a height of from 10 to 30 nm.

4. The magnetic recording medium as claimed in claim 1, wherein the protrusions are provided at the surface in a density of from 0.1 to 100/µm².

5. The magnetic recording medium as claimed in claim 1, wherein the protrusions are provided at the surface in a density of from 1 to 10/µm².

6. The magnetic recording medium as claimed in claim 1, wherein the protrusions contain spherical silica particles.

7. The magnetic recording medium as claimed in claim 1, wherein the nonmetal element is selected from C, Si, B, Te, As, Se, I, N and O.

8. The magnetic recording medium as claimed in claim 1, wherein the nonmetal element is C.

9. The magnetic recording medium as claimed in claim 1, which further comprises a crystal growth defective layer of the second under layer at an interface between the first under layer and the second under layer, said crystal growth defective layer having a thickness of 5 nm or less.

10. The magnetic recording medium as claimed in claim 1, which is used for a recording and reproducing in which the recording and the reproducing are made in a state that the magnetic recording medium contacts with a magnetic head.

11. The magnetic recording medium as claimed in claim 1, wherein the ratio of the ferromagnetic metal alloy/nonmagnetic compound in the magnetic layer is from 95/5 to 80/20 (atomic ratio).

12. The magnetic recording medium as claimed in claim 1, wherein the polymer support is a resin film containing at least one of polyethylene terephthalate and polyethylene naphthalate.

13. The magnetic recording medium as claimed in claim 1, wherein the support has a thickness of from 10 to 63 µm.

14. A magnetic recording medium comprising:
   a nonmagnetic polymer support having a thickness of from 10 to 200 µm, said polymer support being a resin film containing at least one of aromatic polyimide, aromatic polyamide, aromatic polyamideimide, polyether ketone, polyether sulfone, polyether imide, polysulfone, polyphenylene sulfide, polyethylene naphthalate, polyethylene terephthalate, polycarbonate, triacetate cellulose, and a fluorine resin;
   a first under layer which is constituted by a nonmetal element, per se, a compound consisting of nonmetal elements, or a compound containing titanium and a nonmetal element;
   a second under layer containing at least one element selected from the group consisting of chromium, titanium, iridium, platinum, palladium, ruthenium, rhodium, rhenium, osmium, cobalt, tungsten, vanadium, iron and molybdenum; and
   a magnetic layer which contains a ferromagnetic metal alloy containing at least cobalt, platinum and chromium, and a nonmagnetic compound,
   in this order,
   wherein the ratio of the ferromagnetic metal alloy/nonmagnetic compound in the magnetic layer is from 95/5 to 80/20 (atomic ratio).

15. The magnetic recording medium as claimed in claim 14, wherein the nonmagnetic flexible polymer support has a thickness of from 10 to 100 µm.

16. The magnetic recording medium as claimed in claim 14, further comprising a subbing layer between the nonmagnetic flexible polymer support and the first under layer, wherein the subbing layer contains at least one of a polyimide resin, a polyamideimide resin, a silicone resin and a fluorine resin and has, at its surface, protrusions having a height of from 5 to 60 nm.

17. The magnetic recording medium as claimed in claim 16, wherein the subbing layer has, at its surface, protrusions having a height of from 10 to 30 nm.

18. The magnetic recording medium as claimed in claim 16, wherein the protrusions are provided at the surface in a density of from 0.1 to 100/µm².

19. The magnetic recording medium as claimed in claim 16, wherein the protrusions are provided at the surface in a density of from 1 to 10/µm².

20. The magnetic recording medium as claimed in claim 16, wherein the protrusions contain spherical silica particles.

21. The magnetic recording medium as claimed in claim 14, wherein the nonmetal element is selected from C, Si, B, Te, As, Se, I, N and O.

22. The magnetic recording medium as claimed in claim 14, wherein nonmetal element is C.

23. The magnetic recording medium as claimed in claim 14, which further comprises a crystal growth defective layer of the second under layer at an interface between the first under layer and the second under layer, said crystal growth defective layer having a thickness of 5 nm or less.

24. The magnetic recording medium as claimed in claim 14, which is used for a recording and reproducing in which the recording and the reproducing are made in a state that the magnetic recording medium contacts with a magnetic head.

25. The magnetic recording medium as claimed in claim 14, wherein the polymer support is a resin film containing at least one of polyethylene terephthalate and polyethylene naphthalate.

26. The magnetic recording medium as claimed in claim 14, wherein the support has a thickness of from 10 to 63 μm.

* * * * *